US006288144B1

(12) United States Patent
Roberts et al.

(10) Patent No.: US 6,288,144 B1
(45) Date of Patent: Sep. 11, 2001

(54) PROCESSING OF COUPLED, FILLED POLYOLEFINS

(75) Inventors: Darilyn Roberts, Wolcott, CT (US); Paul Davidson, Denham (GB)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/295,191

(22) Filed: Apr. 20, 1999

(51) Int. Cl.$^7$ .............................. C08K 5/541; C08K 9/04; B32B 17/04
(52) U.S. Cl. .................... 523/217; 524/261; 524/269; 524/494; 428/441
(58) Field of Search .................... 524/261, 269, 524/494; 523/217; 428/441

(56) References Cited

U.S. PATENT DOCUMENTS

| | | |
|---|---|---|
| 1,906,935 | 5/1933 | Horst . |
| 1,975,167 | 10/1934 | Meuser ................. 260/130 |
| 2,002,642 | 5/1935 | Meuser et al. ............ 260/130 |
| 2,562,802 | 7/1951 | Mankowich et al. ......... 260/576 |
| 3,452,056 | 6/1969 | Sundholm ............... 260/390 |
| 3,505,225 | 4/1970 | Wheeler ................ 252/33.6 |
| 4,003,874 | 1/1977 | Ide et al. ............. 260/42.18 |
| 4,144,181 | 3/1979 | Elliott et al. ............. 252/33 |
| 4,316,971 | 2/1982 | Rim et al. ............... 525/310 |
| 4,535,113 | 8/1985 | Foster et al. ............ 524/262 |
| 4,663,369 | 5/1987 | Kawai et al. ............ 523/203 |
| 5,075,383 | 12/1991 | Migdal et al. ............ 525/293 |
| 5,236,514 | 8/1993 | Leung et al. ............ 134/22.14 |
| 5,308,648 | 5/1994 | Prince et al. ............ 427/212 |
| 5,414,044 | 5/1995 | Moriya et al. ............ 525/74 |
| 5,484,835 | 1/1996 | Sobajima et al. .......... 524/494 |
| 5,646,207 | 7/1997 | Schell ................... 524/47 |
| 5,670,552 | 9/1997 | Gusavage et al. .......... 521/91 |
| 5,698,500 | 12/1997 | Baranski et al. .......... 508/273 |
| 6,013,217 | * 1/2000 | Hauenstein et al. ......... 524/265 |

FOREIGN PATENT DOCUMENTS

| | | |
|---|---|---|
| 0 455 092 A2 | 3/1991 | (EP) . |
| 0 421 002 A1 | 4/1991 | (EP) . |
| 1397994 | 11/1972 | (GB) . |
| 0456813 | * 1/1975 | (SU) . |
| 95/25074 | 3/1995 | (WO) . |

OTHER PUBLICATIONS

Volk et al; The Effect of Silicone Lubricant on the Extrusion and Quality of Linear Polyethylene, Muanyag Gumi 26(9):257–269 (1989).

Hawkins, W.L. in Polymer Degradation and Stabilization, Springer–Verlag, New York (1984).

* cited by examiner

Primary Examiner—Tae H. Yoon
(74) Attorney, Agent, or Firm—Raymond D. Thompson; Paul Grandinetti

(57) ABSTRACT

A method for reducing the reaction with metal surfaces of a coupled, filled polyolefin comprising the step of including in the formulation of said coupled, filled polyolefin from about 0.01 to about 1.0 weight percent of an organomodified polysiloxane.

9 Claims, No Drawings

PROCESSING OF COUPLED, FILLED POLYOLEFINS

BACKGROUND OF THE INVENTION

1. Field of the Invention

The present invention relates to a means for improving the processing of polyolefin resins that are coupled with polar substrates via grafted polyolefins.

2. Description of Related Art

GMT (glass mat reinforced thermoplastic) is a rapidly growing area in automotive applications.

Grafted polyolefins are commonly used as coupling agents and compatibilizers between polar substrates (mineral fillers, glass, polymers) and unmodified base polyolefins. These grafted polyolefins include, inter alia, maleic anhydride and acrylic acid modified polypropylene, polyethylene, and copolymers thereof. The coupling mechanism generally includes the reaction or interaction of the grafted functionality with the polar substrate and the co-crystallization of the grafted polyolefin with the base polyolefin.

However, compounds containing such grafted polyolefins can be difficult to process owing to the increased adhesion of the composition to metal surfaces through the reaction of the maleic anhydride or acrylic acid with the adsorbed water on the metallic surface in question. For example, some glass mat thermoplastic compounds require maleated polypropylene for improved coupling of a polypropylene base resin to a sized glass fiber reinforcement. During processing, the composition can adhere to metal surfaces present in the processing equipment. As a result, a problem arises as to how to promote coupling between the grafted polyolefin and the polar substrate, while at the same time reducing the tendency for increased adhesion owing to the reaction of, for example, maleic anhydride or acrylic acid, with metallic surfaces of the processing equipment, especially the double belt press, commonly used in GMT production.

A similar problem exists where similar compositions, particularly those comprising highly filled LSOH (low smoke, zero halogen) compounds, are used in wire and cable applications, which require optimally minimized adhesion in order to provide an easier stripping jacket.

U.S. Pat. No. 4,003,874 discloses that a modified polyolefin obtained by adding to 100 parts by weight of a polyolefin 0.01 to 0.8 parts by weight of an unsaturated carboxylic acid or anhydride thereof having 3 to 8 carbon atoms in the molecule and 0.05 to 0.5 part by weight of an organic peroxide and melt-mixing these components in an extruder has outstanding adhesion to glass fibers. A blend of such a modified polyolefin filled with glass reinforcements is said to have excellent physical properties, as well as excellent appearance. The modification of the polyolefin may be effected in the presence of glass reinforcement to achieve both modification and mixing in a single stage, resulting in a composition with superior physical properties owing to improved dispersion and a low level of breakdown of the glass reinforcement.

U.S. Pat. No. 4,535,113 discloses olefin polymer compositions containing silicone additives that can be extruded through relatively narrow die gaps at commercial extrusion rates to provide film material characterized by improved mechanical and optical properties.

U.S. Pat. No. 4,663,369 discloses a glass-fiber reinforced polypropylene composition said to have superior adhesion to the glass fibers therein, stiffness, high-impact properties and molding properties. The composition comprises a graft polypropylene resin obtained by graft-polymerizing a radically polymerizable unsaturated compound onto a crystalline polypropylene resin with an organic catalyst in a hydrocarbon solvent or a blend of the graft polypropylene with a crystalline polypropylene resin, glass fibers treated with an organic silane or titanium compound, calcium stearate and an alkaline earth metal compound.

U.S. Pat. No. 5,236,514 discloses a purging composition useful in cleaning and removing contaminants from processing equipment. The purging composition comprises:
  (a) at least one metal adsorbate compound,
  (b) a matrix resin, and optionally,
  (c) at least one abrasive, and/or
  (d) a carrier resin having a melting point different from that of the matrix resin.

Additionally, processing aids may be present in the composition to serve as conditioning agents on the relatively clean surface generated during purging. A purging composition master batch can be made by mixing 5 percent of a weak metal adsorbate, 10 percent abrasive filler, 5 percent conditioning processing aid, such as UCARSIL PA-1 Processing Aid ( a processing agent comprising a polydimethylsiloxane with pendant polyether groups) in a resin having a higher melting point than the bulk of the resin used for purging. Suitable higher melting carrier resins include polypropylene and the like when used in polyethylene as a matrix. The resin is then extruded and pelleted. Two percent of this master batch is mixed with a purging matrix resin containing about 90 percent resin (e.g., linear low density polyethylene) and about 10 percent filler.

U.S. Pat. No. 5,308,648 discloses a process for applying a polymer additive material, which may, inter alia, be UCARSIL PA-1 Processing Aid, to a polymeric substrate, wherein the process includes the steps of (a) forming in a closed pressurized system a mixture of a solid polymer additive material, a suitable liquid carrier material, and a suitable viscosity reducing material, and (b) spraying this mixture onto a polymeric substrate.

U.S. Pat. No. 5,484,835 discloses a heat-resistant, propylene resin-based material comprising:
A. Three to 97 percent by weight of a resin-impregnated glass fiber bundle comprising:
  1. 20 to 80 parts by weight of glass fibers having a length of at least 3 mm and an average diameter of 20 $\mu$m or less, and
  2. 80 to 20 parts by weight of a crystalline propylene polymer at least partly modified with an unsaturated carboxylic acid or a derivative thereof, the MFR (melt flow rate) of the modified polymer being 50 g/10 min or more, in which the glass fibers are present in constituent 2 in such a state that they are arranged almost in parallel with one another; and
B. 97 to 3 percent by weight of a crystalline propylene polymer having an MFR of 50 g/10 min or more.

It is said that a surface treatment of the glass fibers with a silane coupling agent, for example, an epoxy-silane such as γ-glycidoxypropyl trimethoxy silane, a vinyl-silane such as vinyltrichlorosilane, or an amino-silane such as γ-aminopropyl triethoxysilane, can improve the heat resistance, strength and antiwarping properties of the resulting molding material.

U.S. Pat. No. 5,646,207 discloses an aqueous sizing composition for glass fibers said to be particularly useful for the reinforcement of thermoplastic or thermosetting matrix polymers that contain a film-forming material, fluorescent whitening agent, coupling agent, stabilizing agent and lubricant. The film-forming material is selected to be compatible with the thermosetting or thermoplastic matrix polymer used in the ultimate forming process. The sizing compositions are said to be particularly advantageous for sizing glass fibers to be used in the reinforcement of matrix polymers for forming molded parts.

U.S. Pat. No. 5,670,552 discloses a process for producing thermoplastic foam, including: (a) melting a thermoplastic polymer to produce a polymer melt; (b) introducing a carbon dioxide blowing agent into the polymer melt; (c) adding to the polymer melt one or more additives selected from the group consisting of (1) polysiloxane (which can be UCARSIL PA-1), and (2) mineral oil; and (d) extruding and foaming the melted polymer, blowing agent, and one or more additives to produce thermoplastic foam. The quality of the foams made from a carbon dioxide blowing agent is said to be substantially improved by the addition of the additives.

European Patent Application 0 421 002 A1 discloses a method and composition for lowering the oxygen permeability and enhancing the thermal stability and melt shear stability of monolayer and multilayer packaging films having a layer of vinylidene chloride copolymer film by adding an organic silicon polymer to the vinylidene chloride copolymer. The organic silicon polymer may be UCARSIL PA-1. It is said that, by virtue of the organic silicon polymer, the conventional stabilizer/plasticizer combination of epoxy resin and 2-ethylhexyl diphenyl phosphate may be eliminated from the vinylidene chloride copolymer.

European Patent Application 0 455 092 A2 discloses stable dispersions of a solid phase in a functional fluid and the addition of the stable dispersion to thermoplastic polymers. The functional fluid may be UCARSIL PA-1. It is taught that the resultant thermoplastic polymer compositions are characterized by improved properties and can be formed into products of desired configuration.

WO 95/25074 discloses an aqueous chemical treatment or size for silaceous fibers and fillers that has a polyolefin compatible film-forming polymer, an organo-functional coupling agent, and at least one stabilizer to produce a polyolefin reinforcing article.

Volk et al., *The Effect of Silicone Lubricant on the Extrusion and Quality of Linear Polyethylene, Muanyag es Gumi* 26(9):257–69 (1989) discloses that the addition of 5 weight percent dimethyl siloxane (UCARSIL PA-1) to a master batch containing 90% linear polyethylene and Super Floss antiadhesive agent reduces torque during extrusion, melt pressure, and the temperature of the melt. The optical properties and aesthetic value were reported to be improved also by using PA-1.

Processing aids are also known in the art as lubricants, which describes the mechanism by which they function. Silicone processing aids are used in mainly mineral filled polyolefins to reduce the friction between the melt and the extruder and between the melt and the filler particles. PA-1 is a special silicone and has proved too expensive for this application. The same effect can be achieved with cheaper silicones, stearates, and the like.

Most GMT is currently produced without a coupling agent. The main reason for this is that the coupling agent reacts with hot metal (especially the double belt press) and adheres to it. This adhesion can be very severe, causing major surface damage to the GMT sheet and considerable down time as the adhered material is manually cleaned off the belt. GMT producers would like to get the improved properties that the use of a coupling agent would provide, but this adhesion problem limits their use.

The disclosures of the foregoing are incorporated herein by reference in their entirety.

SUMMARY OF THE INVENTION

The present invention is directed to the discovery that the use of up to 1 weight percent of a processing aid in a coupled, filled polyolefin compound results in improved processing (reduced adhesion to metal processing equipment) and retained physical properties. More particularly, the present invention relates to a method for reducing the reaction with metal surfaces of a coupled, filled polyolefin comprising the step of including in the formulation of said coupled, filled polyolefin from about 0.01 to about 1.0 weight percent of an organomodified polysiloxane. The polysiloxane suppresses the reaction between the coupling agent (generally, maleic anhydride) and hot metal, but not between the coupling agent and the size on the filler, e.g., glass fiber. Since the belt of the double belt press of the GMT process and the GMT sheet do not move relative to one another, there is no friction reducing mechanism at work here, i.e., the polysiloxane is not working as a lubricant.

DESCRIPTION OF THE PREFERRED EMBODIMENTS

The present invention is characterized by a polymeric material to which a processing aid comprising an organomodified polysiloxane, in an amount of from about 0.01 to about 1.0 percent by weight based upon the total weight of the final polymeric material, has been added. The polymeric materials comprise a base polymer from the group of thermoplastic resins, especially polyolefins, preferably polyethylene, polypropylene, or a combination of the two and a graft-modified α-olefin copolymer to which certain polar filler materials, e.g., glass, mineral fillers, polymers in various forms (fibers, plates, particles, or powders), have been added. The amount of the polar filler based upon 100 parts by weight of the total weight of the polyolefin base resin and the graft-modified α-olefin copolymer is about 1 to about 100 parts by weight, preferably about 5 to about 50 parts by weight.

Specific examples of the polar filler are silica, diatomaceous earth, titanium oxide, magnesium oxide, pumice powders, pumice balloon, aluminum hydroxide (aluminum trihydrate, ATH), magnesium hydroxide, basic magnesium carbonate, dolomite, calcium sulfate, potassium titanate, barium sulfate, calcium sulfite, talc, clay, mica, asbestos, glass fibers, glass flakes, glass beads, calcium silicate, montmorillonite, bentonite, graphite, aluminum powders, molybdenum sulfate, boron fibers, silicon fibers, and the like, used either alone or in combination.

The thermoplastic base polymers are preferably derived from ethylene, including low density polyethylene (LDPE), linear low density polyethylene (LLDPE), medium density polyethylene (MDPE), high density polyethylene (HDPE), or other ethylene derived resins that have densities from 0.85 to 1.4 $gm/cm^3$; homopolymers derived from mono- and di-ethylenically unsaturated hydrocarbon monomers of $C_3$ and above, such as polypropylene, polyisobutylene, polymethylbutene-1, polymethylpentene-1, polybutene-1, polyisobutylene, and the like; copolymers derived from two or more monomers, such as ethylene-propylene copolymers having at least a majority of propylene, propylene-butene-1 copolymers, propylene-isobutylene copolymers, and the like, and blends thereof. It is preferred that the thermoplastic base resin be a polyolefin resin and most preferred that it be polypropylene.

It is known that polypropylene reinforced with certain polar substances, particularly glass, such as glass fibers, have superior stiffness, heat resistance, and the like, as compared to polypropylene lacking such reinforcement. For this reason, filled materials have been extensively used for various articles of manufacture, such as automobile parts, electrical parts, and the like. In the production of glass-fiber reinforced polypropylene, it has been found that where crystalline polypropylene and glass fibers are melt-kneaded together, there is a significant improvement in is mechanical properties. This improvement can be further enhanced by grafting an unsaturated carboxylic acid or anhydride thereof onto the polyolefin polymer. See, for example, U.S. Pat. No. 4,003,874. Thus, a reinforced polyolefin composite can be produced by a process comprising adding to 100 parts by weight of a polyolefin about 0.01 to about 0.8 part by weight of an unsaturated carboxylic acid or anhydride thereof, preferably having three to eight carbon atoms in the molecule, and about 0.05 to about 0.5 part by weight of a free radical initiator, melt-mixing the resulting admixture in an extruder, blending the resulting modified polyolefin with 5 to 200 parts by weight of polar filler per 100 parts by weight of the polyolefin, and molding the resulting mixture.

Where an olefinic copolymer is employed in the practice of the present invention, it can be an ethylene copolymer containing from about 2 to about 98 weight percent, preferably from about 30 to about 80 weight percent ethylene and, correspondingly, from about 98 to about 2 weight percent, preferably from about 70 to about 20 weight percent of one or more $C_3$ to $C_{28}$, preferably $C_3$ to $C_{18}$, more preferably $C_3$ to $C_8$, α-olefins, most preferably polypropylene. Such copolymers preferably have a degree of crystallinity of less than 25 weight percent, as determined by X-ray and differential scanning calorimetry, and a number average molecular weight in the range of about 700 to about 500,000, preferably about 10,000 to about 250,000, as determined by vapor phase osmometry or membrane osmometry. Other α-olefins that are suitable in place of polypropylene to form the copolymer or to be used in combination with ethylene and propylene to form an interpolymer include 1-butene, 1-pentene, 1-hexene, 1-octene, and the like, as well as branched chain α-olefins, such as 5-methylpentene-1, 6-methylheptene-1, and the like, and mixtures thereof.

Interpolymers of ethylene, an α-olefin as described above, and a nonconjugated diene or triene or mixtures of such dienes and/or trienes can also be used. The amount of the nonconjugated diene ranges from about 0.5 to about 20 mole percent, preferably from about 1 to about 7 mole percent, based on the total amount of ethylene and α-olefin present. Suitable dienes include any nonconjugated straight chain or cyclic diene hydrocarbons that are copolymerizable with the ethylene and the α-olefin. Examples of suitable dienes are straight or branched chain diolefins, such as those in which both double bonds are terminal as in 1,4-pentadiene, 1,5-hexadiene, 2-methyl-1,5-hexadiene, 3,3-dimethyl-1,5-hexadiene, 1,7-octadiene, 1,9-decadiene, 1,19-eicosadiene, and the like, and diolefins in which only one double bond is terminal, such as 1,4-hexadiene, 1,9-octadecadiene, 6-methyl-1,5-heptadiene, 7-methyl-1,6-octadiene, 11-ethyl-1,11-tridecadiene, and the like. Also suitable are the bridged-ring diene hydrocarbons of similar nature containing seven to ten carbon atoms, especially those containing a methano or ethano bridge, for example: (a) unsaturated derivatives of bicyclo(2.2.1) heptane containing at least two double bonds, including bicyclo(2.2.1)hepta-1,5-diene, dicyclopentadiene, tricyclopentadiene, and tetracyclopentadiene; (b) unsaturated derivatives of bicyclo(2.2.2)octa-2,5-diene; (c) unsaturated derivatives of bicyclo(3.2.1)octane containing at least two double bonds; (d) unsaturated derivatives of bicyclo (3.3.1) nonane containing at least two double bonds; (e) unsaturated derivatives of bicyclo(3.2.2) nonane containing at least two double bonds; and the like. It is also possible to use conjugated dienes to confer unsaturation on the ethylene/α-olefin copolymer. Similarly, certain monomers having hydrogen atoms that can be readily removed by free radicals, such as phenylnorbornene, are also functional equivalents of the dienes. Representative dienes include cyclopentadiene, 2-methylene-5-norbornene, nonconjugated hexadiene, or any other alicyclic or aliphatic nonconjugated diene having from 6 to 15 carbon atoms per molecule, such as 2-methyl or ethyl norbornadiene, 2,4-dimethyl-2-octadiene, 3-(2-methyl-1-propene)cyclopentene, ethylidene norbornene, and the like.

If a triene is used in the compositions employed in the practice of this invention in place of, or in addition to, a diene, it will have at least two nonconjugated double bonds, and up to about 30 carbon atoms in the chain. Typical trienes useful in preparing the copolymers include 1-isopropylidene-3a,4,7,7a-tetrahydroindene, 1-isopropylidenedicyclopentadiene, dehydro-isodicyclopentadiene, 2-(2-methylene-4-methyl-3-pentenyl)[2.2.1]bicyclo-5-heptene, and the like.

These ethylene copolymers, which term is intended to include terpolymers and other oligomers, may be prepared using the well known Ziegler-Natta catalyst compositions, as described in U.K. Patent No. 1,397,994.

Such polymerization may be effected to produce the ethylene copolymers by passing 0.1 to 15 parts of ethylene; 0.05 to 10 parts of the higher α-olefin, preferably propylene; and from 10 to 10,000 parts of hydrogen per million parts of ethylene; into 100 parts of an inert liquid solvent containing (a) from about 0.0017 to 0.017 part of a transition metal principal catalyst, for example $VOCl_3$; and (b) from about 0.0084 to 0.084 part of a cocatalyst, e.g., $(C_2H_5)_3Al_2Cl_3$; at a temperature of about 25° C. and a pressure of 60 psig for a period of time sufficient to effect optimum conversion, for example, 15 minutes to one-half hour; all parts being parts by weight.

The materials that are grafted onto the polymer or copolymer are organic compounds that contain at least one ethylenic bond and at least one, preferably two, carboxylic acid or its anhydride groups or a polar group that is convertible into said carboxyl groups by oxidation or hydrolysis. Maleic anhydride or a derivative thereof is preferred as it does not appear to homopolymerize appreciably but, rather, grafts onto the olefin polymer or copolymer to give two carboxylic acid functionalities. Such preferred materials have the generic formula:

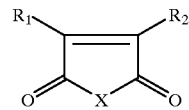

wherein $R_1$ and $R_2$ are hydrogen or a halogen and X is oxygen, NH, or $NR_3$, wherein $R_3$ is a hydrocarbyl amine or alkyl group, e.g., a $C_1$ to $C_{40}$ alkyl.

Examples of the free radical polymerizable unsaturated compound to be grafted onto the polyolefin base polymer are α,β-unsaturated aliphatic monocarboxylic acids and derivatives thereof, α,β-unsaturated aliphatic dicarboxylic acids and derivatives thereof, alkenyl pyridines and derivatives thereof, and the like. These compounds may be used alone or in admixture. Specific examples of the compounds include acrylic acid, methacrylic acid, crotonic acid, crotonic anhydride, cinnamic acid, methyl acrylate, methyl methacrylate, methyl cinnamate, 2-hydroxyethyl methacrylate, 2-hydroxyethyl acrylate, glycidyl acrylate, glycidyl methacrylate, acrylamide, methacrylamide, N,N-dimethylacrylamide, N,N-dimethylmethacrylamide, acrylonitrile, methacrylonitrile, vinylidene cyanide, vinyl formate, vinyl chloroacetate, allyl acetate, vinyl trifluoroacetate, vinyl benzoate, maleic acid, fumaric acid, itaconic acid, maleic anhydride, chloromaleic anhydride, itaconic anhydride, monoethyl maleate ester, diethyl maleate ester, monomethyl fumarate ester, dimethylfumarate ester, mono-n-butyl itaconate, di-n-butyl itaconate ester, maleic acid monoamide, maleic acid diamide, maleic acid-N-monoethylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, N-hexyl maleimide, styrene, α-methylstyrene, trichlorostyrene, 2-vinylpyridine, 4,vinylpyridine, N-vinylcarbazole, vinyl isocyanate, vinyl sulfonate and its alkali metal salts, α-methylvinyl sulfonate, vinyl chloride, vinyl bromide, vinylidene chloride, vinyltrimethylsilane, allyltrimethylsilane, vinyltrichlorosilane, allyltrichlorosilane, and the like.

The quantity of these free radical polymerizable unsaturated compounds has no particular limitation, but typically they are employed in a range of about 0.01 to about 100 parts by weight, based on 100 parts by weight of the base resin, e.g., crystalline polypropylene.

The graft copolymers employed in the practice of the present invention can, if desired, be prepared by graft-polymerizing the radically polymerizable unsaturated compound onto the base resin with a free radical initiator in a hydrocarbon solvent. Examples of hydrocarbon solvents that can be used include aromatic hydrocarbons, alkylaromatic hydrocarbons, halogenated aliphatic hydrocarbons, and the like, such as benzene, toluene, xylene, mixed xylenes, trimethylbenzenes, tetramethylbenzenes, ethylbenzene, cumene, cymene, chlorobenzene, dichlorobenzene, bromobenzene, pentane, hexane, heptane, octane, cyclohexane, chloroform, carbon tetrachloride, chloroethane, 1,1-dichloroethane, 1,1,2,2-tetrachloroethane, 1,1-dibromomethane, 1,2-dibromomethane, 1,1,2,2-tetrabromoethane, and the like. Such solvents can be used alone or in admixture.

The quantity of the solvent used will vary depending upon the solvent used, the polymerization degree of the crystalline polypropylene used, and the kind and quantity of the free radical polymerizable unsaturated compound to be grafted, but usually the quantity is preferred to be in the range of from about 5 to about 50 percent by weight, preferably from about 8 to about 20 percent by weight, in the reaction mixture solution.

As the free radical initiators used in the graft polymerization, any of those that are normally used in free radical polymerizations may be used, such as peroxides, hydroperoxides, and azo compounds, preferably those having a boiling point greater than about 100° C. and that decompose thermally within the grafting temperature range to provide free radicals. Examples include t-butyl peroxide, methyl ethyl ketone peroxide, methyl isobutyl ketone peroxide, lauroyl peroxide, benzoyl peroxide, cyclohexanone peroxide, t-butylperoxybenzoate, dicumyl peroxide, cumene hydroperoxide, diisopropylhydrobenzene peroxide, 2,5-dimethyl-2,5-di(t-butylperoxy) hexane, di-t-butyl peroxide, 2,5-dimethyl-2,5-di(t-butylperoxy)hexine-3, azobutyronitrile, azobisisobutyronitrile, dimethylazoisobutyrate, and the like, and mixtures of the foregoing. The initiator is used in an amount of between about 0.005 percent and about 1 percent by weight based on the weight of the reaction mixture solution. The grafting is preferably carried out in an inert atmosphere, such as under nitrogen blanketing. The reaction time has no particular limitation, but is typically in the range of from about 0.5 to about 20 hours.

In a preferred embodiment of the present invention, the polyolefin is introduced into the extruder, where it forms a melt, and then the functional monomer, i.e., the unsaturated carboxylic acid or anhydride thereof, and the initiator are introduced via injection through suitable ports whereby the graft copolymer is formed inside the extruder. Upon emerging from the extruder, the graft copolymer melt is normally pelletized. Alternatively, it can be brought directly into contact with a glass reinforcing mat, preferably, in GMT production, by means of a double belt laminator.

The grafted polypropylene resin as obtained above may be used as it is, but in the interest of minimizing costs and adjusting the viscosity of the final product, it may be advantageous to prepare a grafted polypropylene resin having a high percentage of grafted unsaturated compound and blend this resin with an ungrafted crystalline polypropylene resin. The blending proportion varies depending on the level of grafting on the grafted polypropylene, but it is preferred to add the grafted polypropylene so that the quantity of the grafted free radical polymerizable unsaturated compound in the final product can fall within a range of from about 0.005 to about 3.0 parts by weight, preferably about 0.05 to about 2.0 parts by weight, based on 100 parts by weight of the polar filler, e.g., glass fibers, in the filler reinforced polyolefin composition.

Where glass reinforcing materials are used as the polar fillers in the practice of the present invention, they can, for example, be in the form of glass rovings or glass chopped strands, glass cloths, glass powders, glass beads, and the like. Glass mats of the type typically used in GMT production are preferred. These reinforcing materials can, if desired, be pretreated with, for example, an organic silane compound or an organic titanium compound as disclosed in U.S. Pat. No. 4,663,369. Examples of organic silanes that can be used for this purpose include vinyltrichlorosilane, vinyltris(β-methoxyethoxy)silane, vinyltriethoxy silane, γ-methacryloxypropyltrimethoxysilane, β-(3,4-epoxycyclohexyl)ethyltrimethoxysilane, γ-glycidoxypropyltrimethoxysilane, N-(β-aminoethyl)-γ-aminopropyltrimethoxysilane, N-(β-aminoethyl)-γ-aminopropylmethyldimethoxysilane, γ-aminopropyltriethoxysilane, N-phenyl-γ-aminopropyltrimethoxysilane, γ-chloropropyltrimethoxysilane, and the like.

Examples of organic titanium compounds that can be used to pretreat the glass fibers include isopropyltriisostearoyl titanate, isopropyltridodecylbenzenesulfonyl titanate, isopropyltris(dioctylpyrophosphate)titanate, tetraisopropylbis(dioctylphosphite)titanate, tetraoctylbis(ditridecylphosphite)titanate, tetra(2,2-diallyloxymethyl-1-butyl)bis(ditridecylphosphite)titanate, bis(dioctylpyrophosphate)oxyacetatetitanate, bis(dioctylpyrophosphate)ethylenetitanate, and the like.

Where the polar fillers employed in the practice of the present invention are glass fibers that have been pretreated with an organic silane or titanium compound as described above, the quantity of such pretreatment compound used is preferably in the range of from about 0.01 to about 0.1 part by weight based on 100 parts by weight of the glass fibers. Where glass fibers are used, they typically have a single fiber diameter of about 1 to about 15 μm and a length of about 1 to about 100 mm.

The present invention is directed to the use of a grafted polyolefin of the type described above in combination with a polyorganosiloxane in a glass or polar mineral filled polyolefin. This combination improves the processing of the glass/filler coupled polyolefin while simultaneously retaining the excellent physical properties provided by the grafted polyolefin coupling mechanism between the filler and the base resin. A preferred polyorganosiloxane is polydialkyl siloxane, such as polydimethylsiloxane. A particularly preferred polyorganosiloxane is an organomodified polydimethylsiloxane fluid having pendant polyether groups, a molecular weight of about 8000, and a viscosity of about 1200 centipoise that is commercially available from the Witco Chemical Co. under the trademark UCARSIL PA-1. One reason for this preference is that UCARSIL PA-1 is non-blooming and does not affect the paintability of the final composite, a feature that is very important to the automotive industry.

The polyorganosiloxanes, which are also known as silicones, that are useful in the practice of the present invention have been described in European Patent No. 0 455 092 A2 and can be represented generically by the formula:

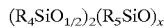

wherein $R_4$ and $R_5$ can be the same or different and can be any of a wide variety of monovalent organic radicals, and x is an integer $\geq 1$. These polyorganosiloxanes are known to possess excellent thermal, oxidative, and hydrolytic stability, have low to surface tension, are odorless, and retard additive agglomeration.

The present invention particularly pertains to the use of a subclass of synthetic silicone polymers that are fluid under the conditions used for mixing solid additives with thermoplastic resins and particularly for extruding thermoplastic resins. Such silicones typically exhibit a molecular weight ranging from about 200 to about 150,000. Suitable silicone fluids may be linear, branched, or cyclic.

Silicone fluids that have been chemically modified to introduce a suspension stability enhancing polar group such as hydroxy, hydroxyalkyl, carboxy, amine, amide, carbamate, aldehyde, nitrile, phenol, vicinal epoxy, alkoxy, phosphite, phosphine, phosphonate, carboxylic acid ester, polyether, e.g., polyalkylene oxide, thiol, sulfide, and/or other polar moiety on the polysiloxane are particularly useful in the present invention. Such silicone fluids generally serve the dual roles of forming a stable suspension with solid additives, enhancing the dispersion of the additives with the thermoplastic resin and acting as thermoplastic adjuvants in their own right. In accordance with the broadest aspects of the present invention, the suspension stability enhancing polar group or moiety can be positioned either along the polymeric silicone backbone or as part of a substituent pendant to the silicone backbone. U.S. Pat. No. 4,778,838 illustrates a known silicone polymer having such moieties in both positions. Preferably, the moieties are positioned in a pendant position.

A preferred class of silicone fluids having only pendant moieties can be represented by the formula:

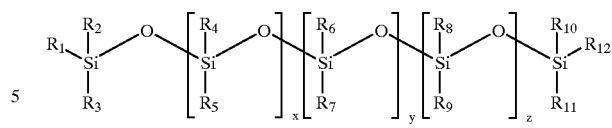

wherein the substituents $R_1$ through $R_{12}$, which can be the same or different, are selected from alkyl groups, preferably those having from 1 to 18 carbon atoms, aryl groups such as phenyl, and alkylphenyls, and other monovalent organic radicals containing a moiety selected from hydroxy, hydroxyalkyl, carboxy, amine, amide, carbamate, aldehyde, nitrile, phenol, vicinal epoxy, alkoxy, phosphite, phosphine, phosphonate, carboxylic acid ester, polyether, e.g., polyalkylene oxide, thiol, and sulfide; and wherein the sum of x, y, and z, which can be the same or different, can be from 1 to 3000. As is known, the substituents on a single silicon atom need not all be the same. Thus, they can all be methyl groups or they can be a combination of two or more alkyl groups or other groups as defined above.

It is to be understood that the linear silicones may contain small amounts of branched silicones having minor amounts of tri and tetra functional siloxane units.

The simplest silicone fluids, chemically speaking and according to the above formula, for use in the practice of the present invention, are the polydimethylsiloxanes. In the polydimethylsiloxanes, the substituents $R_1$ through $R_{12}$ in the formula are all methyl groups. Such silicone fluids can be prepared by polymerizing a cyclic siloxane or a mixture thereof such as hexamethylcyclotrisiloxane, octamethylcyclotetrasilane, or decamethylcyclopentasiloxane in the presence of an acid catalyst and an end-capper such as hexamethyldisiloxane.

Preferred silicone fluids can be represented by the above formula with at least one of $R_6$ through $R_9$ being a monovalent organic radical containing one of the above-mentioned polar moieties. Generally, the substituents $R_1$ through $R_6$ and $R_9$ through $R_{12}$ constitute alkyl or aryl moieties, most typically all being methyl, with the substituents $R_7$ and $R_8$ containing one or more of the above-mentioned polar moieties. In this preferred embodiment, x has a value between 0 and 2000, preferably between 5 and 750; y has a value between 1 and 500, preferably between 5 and 250; and z has a value between 0 and 500. Such polydiorganosiloxanes, and particularly the polydialkylsiloxanes, are well known in the art and need not be described in detail.

For example, dimethylsilicones can be provided with polyethylene oxide, vicinal epoxy, or amino moieties for improving thermoplastic resin processing. Such processing aids are described in U.S. Pat. No. 4,535,113, the disclosure of which is incorporated herein by reference.

Polysiloxanes having various substituents in pendant positions along their backbone are well known in the art. Such materials can be prepared by the catalytic addition of aliphatically unsaturated compounds having the desired substituent to hydrosiloxanes at a molar ratio sufficient to consume the hydrosiloxane moieties or by dehydrocondensation of alcohols with hydrosiloxanes. Usually a platinum catalyst such as chloroplatinic acid is used. As will be recognized by those skilled in the art, hydrosiloxanes can be prepared by reacting a mixture containing octamethylcyclotetrasiloxane, 1,2,3,4-tetramethylcyclotetrasiloxane, a chain terminator such as hexamethyldisiloxane, and an acid catalyst. Instead of tetramethylcyclotetrasiloxane, a tri-methyl end-blocked methylhydrogenpolysiloxane can be used. By varying the mole ratio of the various reactants, the molecular weight and number of various repeating units can be varied.

The admixture of the silicone additives and olefin polymers can be conveniently effected in a suitable mixer, such as a Banbury mixer, heating roll, extruder, or the like. Where an extruder is used, the extruder, which can have a single screw or a twin screw, and the shape of the screw used, have no particular limitation. Frequently, in a GMT process, an extruder is used to deliver a melt to a glass mat.

To the compositions employed in the practice of this invention can also be added various materials commonly added to extrudable compositions, such as the metal adsorbates described in U.S. Pat. No. 5,236,514, e.g., sodium stearate, potassium stearate, zinc stearate, calcium stearate, potassium laurate, phosphate esters, and the like. Other materials include additives, such as pigments, lubricants, slip agents, antioxidants, antiblock agents, antistatic agents, flame retardants, dispersants, UV stabilizers, thermostabilizers, nucleating agents, catalyst deactivators, acid neutralizers, and the like, in amounts well known in the art. In particular, the compositions employed in the practice of the present invention can advantageously include the combination of thermal stabilizers disclosed in U.S. patent application Ser. No. 09/188,426, filed Nov. 9, 1998.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

The improved process of the present invention was evaluated in an unfilled polypropylene base resin (compounds 1–5) to demonstrate reduced adhesion through suppressing the reaction between maleic anhydride and metallic surfaces. The process was also tested with 30 percent glass filled, coupled polypropylene compounds (compounds 6–9) to illustrate the retention of physical properties. Compounds 1–5 were dry blended and compounded on a 30 mm twin screw extruder and pressed to stainless steel or aluminum sheets. The resins of compounds 6–7 were dry blended and compounded on a 40 mm twin screw extruder with glass addition via a side feeder. UCARSIL PA-1 may be conveniently handled in the form of a 15 percent active masterbatch in polypropylene available as Loxiol PA100 from Henkel, Germany. Physical testing and peel adhesion testing were conducted on an INSTRON tensile tester.

Compounds 1–5 illustrate the reduced adhesion of the polyolefin composition to stainless steel and aluminum surfaces resulting from the addition of UCARSIL PA-1 to a blend of polypropylene and maleic anhydride grafted polypropylene. The maleic anhydride grafted polypropylene used is Polybond 3000, commercially available from Uniroyal Chemical Company, Inc., which contains 1.2 weight percent maleic anhydride. A 75 percent reduction in adhesion is observed in both cases when 0.83 percent of the UCARSIL PA-1 is added (see Tables 1 and 2). As previously mentioned, the reduced adhesion must not interfere with the coupling mechanism of the filler, the coupling agent, and the base resin. Compounds 6 (no coupling agent) and 7 (with coupling agent) illustrate the improved properties provided by the addition of coupling agent. The physical properties of glass filled, maleic anhydride grafted polypropylene coupled, polypropylene compounds (compounds 8–10) containing the processing aid and a control compound (7) without processing aid are equivalent (see Tables 1 and 3–5).

This observation confirms that the UCARSIL PA-1 does not hinder the coupling mechanism between the glass, the maleic anhydride grafted polypropylene coupling agent, and the base polypropylene resin.

TABLE 1

Maleic Anhydride Grafted Polyolefin/Processing Aid Blends

| Compound | Maleic Anhydride Grafted Polypropylene | Polypropylene | Processing Aid[1] | Glass[2] |
|---|---|---|---|---|
| 1 | 5 | 95 | 0 | 0 |
| 2 | 5 | 94.67 | 0.33 | 0 |
| 3 | 5 | 94.5 | 0.5 | 0 |
| 4 | 5 | 94.33 | 0.67 | 0 |
| 5 | 5 | 94.17 | 0.83 | 0 |
| 6 | 0 | 70 | 0 | 30 |
| 7 | 5 | 65 | 0 | 30 |
| 8 | 5 | 64.5 | 0.5 | 30 |
| 9 | 5 | 64.2 | 0.8 | 30 |
| 10 | 5 | 64.7 | 0.3 | 30 |

[1]LOXIOL PA 100 PP (15 percent active UCARSIL PA-1 in polypropylene)
[2]PPG 3298 FG

TABLE 2

Adhesion Results (lb./in.)

| Compound | To Stainless Steel | To Aluminum |
|---|---|---|
| 1 | 1.22 | 7.76 |
|   | 1.49 | 8.29 |
|   | 1.02 | 9.86 |
|   | Average 1.2 | Average 8.6 |
| 2 | .214 | 2.6 |
|   | .429 | 9.5 |
|   | .261 | 6.63 |
|   | Average 0.3 | Average 6.2 |
| 3 | .24 | 3.14 |
|   | .47 | 5.42 |
|   | .5 | 3.25 |
|   | Average 0.4 | Average 3.9 |
| 4 | .5 | 1.24 |
|   | .214 | 5.04 |
|   | .295 | .564 |
|   | Average 0.3 | Average 2.3 |
| 5 | .4 | .966 |
|   | .3 | 1.56 |
|   | .25 | 3.71 |
|   | Average 0.3 | Average 2.1 |

TABLE 3

Physical Properties

| Compound | 6 | 7 | 8 | 9 | 10 |
|---|---|---|---|---|---|
| Tensile Strength (psi) | 12700 | 15132 | 14896 | 14660 | 14678 |
| Flexural Strength (psi) | 12892 | 18011 | 18305 | 17444 | 18002 |
| Flexural Modulus (kpsi) | 688 | 669 | 715 | 688 | 720 |
| NIRT (ftlbs./in.) | 1.47 | 2.36 | 2.38 | 2.28 | 2.51 |
| Rev. NIRT (ftlbs./in.) | 4.14 | 8 | 8.14 | 8.52 | 8.7 |

TABLE 4

Physical Properties After 20 Days Suds Aging[1]

| Compound | 6[2] | 7 | 8 | 9 | 10 |
|---|---|---|---|---|---|
| Tensile Strength (psi) | — | 12223 | 12465 | 12291 | 12146 |
| Flexural Strength (psi) | — | 15688 | 15831 | 16225 | 16163 |
| Flexural Modulus (kpsi) | — | 650 | 764 | 686 | 617 |
| NIRT[3] (ftlbs./in.) | — | 1.83 | 1.85 | 1.61 | 1.67 |
| Rev. Notch (ftlbs./in.) | — | 5.43 | 5.54 | 5.86 | 6.4 |

[1]Suds Aging: Samples are immersed in 95° C. moving water with 0.5 percent detergent.
[2]Not evaluated.
[3]NIRT is Notched IZOD Room Temperature.

TABLE 5

Physical Properties After 40 Days Suds Aging[1]

| Compound | 6[2] | 7 | 8 | 9 | 10 |
|---|---|---|---|---|---|
| Tensile Strength (psi) | — | 12850 | 11006 | 11336 | 11675 |
| Flexural Strength (psi) | — | 15720 | 16416 | 16166 | 16159 |
| Flexural Modulus (kpsi) | — | 712 | 848 | 707 | 769 |
| NIRT[3] (ftlbs./in.) | — | 1.44 | 1.51 | 1.47 | 1.63 |
| Rev. Notch (ftlbs./in.) | — | 4.48 | 4.36 | 4.78 | 5.21 |

[1]Suds Aging: Samples are immersed in 95° C. moving water with 0.5 percent detergent.
[2]Not evaluated.
[3]NIRT is Notched IZOD Room Temperature.

In view of the many changes and modifications that can be made without departing from principles underlying the invention, reference should be made to the appended claims for an understanding of the scope of the protection to be afforded the invention.

What is claimed is:

1. In a method for the production of glass mat thermoplastic products wherein, in the course of said production, coupled, glass-filled thermoplastic resin is brought into contact with metal surfaces and reacts therewith, the improvement that comprises reducing the reaction by means of the step of including in said coupled, glass-filled thermoplastic resin from about 0.01 to about 1.0 weight percent of an organomodified polysiloxane.

2. The method of claim 1 wherein the thermoplastic resin is selected from the group consisting of
   (a) polyethylene,
   (b) polypropylene,
   (c) copolymers of ethylene and propylene, and
   (d) interpolymers of ethylene, propylene, and a nonconjugated diene.

3. The method of claim 1 wherein the coupled, glass-filled thermoplastic resin is coupled by means of a grafted polyolefin.

4. The method of claim 3 wherein the grafted polyolefin is a polyolefin having grafted thereto an organic compound that contains at least one ethylenic bond and at least one carboxylic acid, or its anhydride, group or a polar group that is convertible into said carboxylic acid group by oxidation or hydrolysis.

5. The method of claim 4 wherein the organic compound has the generic formula:

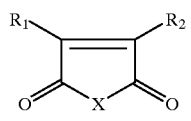

wherein $R_1$ and $R_2$ are hydrogen or a halogen and X is oxygen, NH, or $NR_3$, wherein $R_3$ is a hydrocarbyl amine or alkyl group.

6. The method of claim 5 wherein the organic compound is maleic anhydride.

7. The method of claim 1 wherein the organomodified polysiloxane is an organomodified polydialkylsilane.

8. The method of claim 7 wherein the organomodified polydialkylsilane is an organomodified polydimethylsilane.

9. The method of claim 6 wherein the organomodified polysiloxane is an organomodified polydimethylsilane.

* * * * *